Dec. 12, 1961  G. E. WINTERMUTE ET AL  3,012,926
METHOD OF MAKING QUILTED PADDED ARTICLES
Filed Oct. 17, 1957
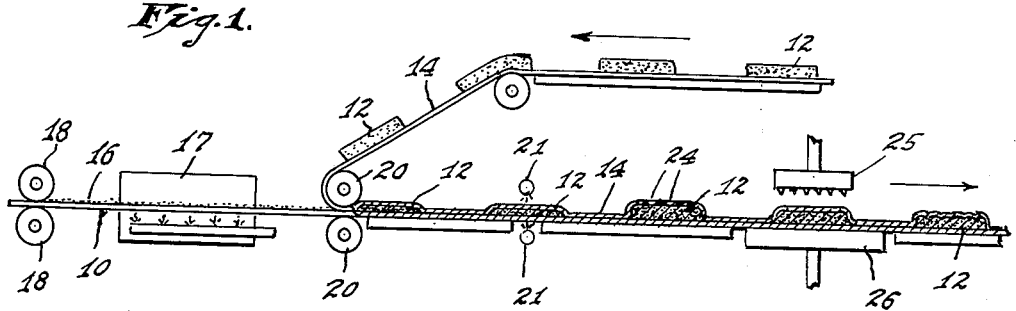
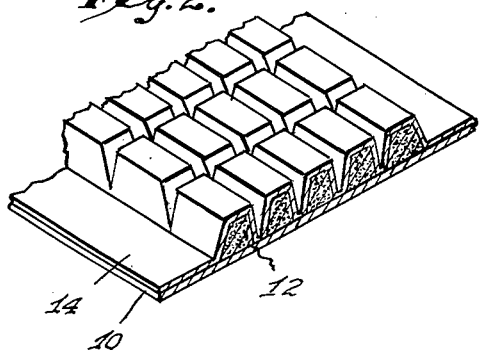
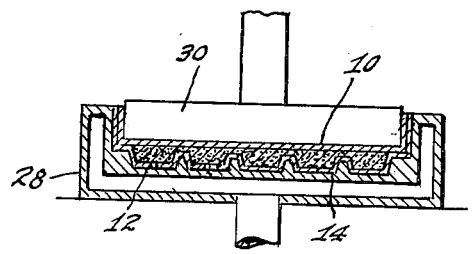
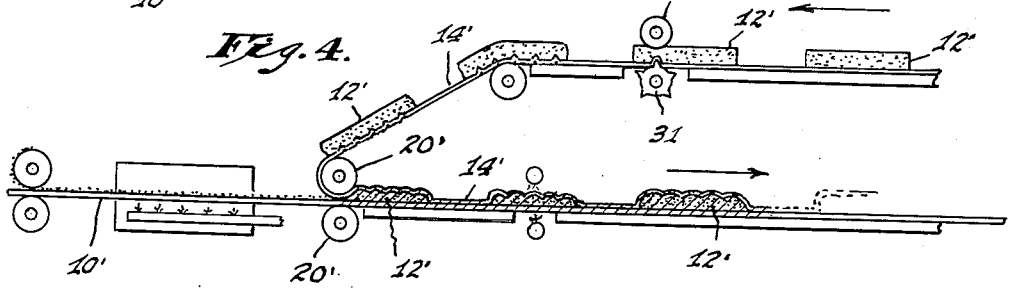
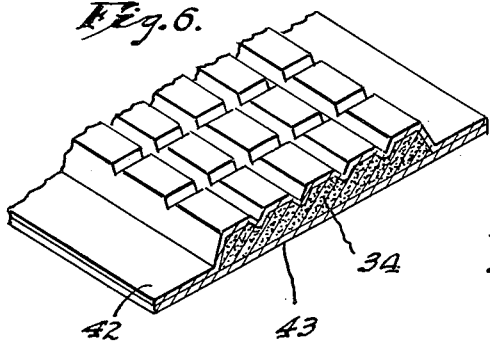
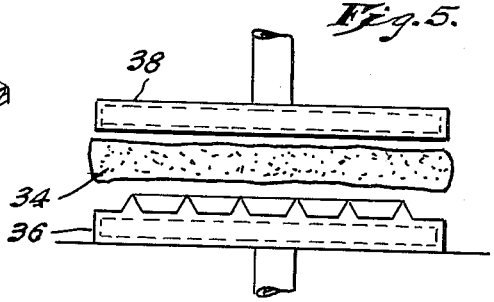
INVENTORS
GLENN E. WINTERMUTE,
JAMES K. SMITH and
BY JOSEPH J. LEBEN,
ATTORNEYS.

United States Patent Office 3,012,926
Patented Dec. 12, 1961

3,012,926
METHOD OF MAKING QUILTED PADDED ARTICLES
Glenn E. Wintermute, James K. Smith, and Joseph J. Leben, Columbus, Ind., assignors to Arvin Industries, Inc., Columbus, Ind., a corporation of Indiana
Filed Oct. 17, 1957, Ser. No. 690,792
9 Claims. (Cl. 156—199)

This invention relates to a method of making quilted padded articles, and is principally concerned with the production of an article comprising a sheet-metal, or other rigid back member, a quilted foam-elastomer pad thereon, and a skin of flexible sheet material covering said pad and structural member and exhibiting the quilted pattern of the pad. This method of making quilted padded articles is particularly well adapted for incorporation in a method of making padded articles described in co-pending patent application Serial No. 653,402, filed April 17, 1957.

The principal feature characterizing our invention is the step of quilting a foam-elastomer pad of open cell structure between two sheets of material, at least one of which is a flexible stretchable material. The flexible stretchable material, being in intimate contact with the pad, conforms to the quilted pattern of the pad for producing a quilted effect in the finished padded panel, the depth of quilting being controlled to produce the desired quilted effect.

According to one mode of practicing this invention where one of the pad enclosing sheets is of metal, we form a laminated panel comprising a foam-elastomer pad precut to the desired size and shape and interposed between a sheet of metal and a sheet of flexible material constituting a panel covering skin. The flexible material and the metal extend beyond the margins of the pad and are bonded together to form an air-tight seal bordering the edges of the pad.

The skin covered padded panel is subjected to a quilting or embossing operation with heat and pressure being applied in a predetermined pattern to the skin face of the panel; the pressure of the embossing die compressing the pad in the pattern of said die and the heat fusing the compressed portions of said pad into a thin layer of substantially solid elastomer. During this quilting operation, the skin is forced into the depressions formed in the pad and is bonded to the metal sheet by the fused elastomer. Other methods and embodiments of our invention for producing the desired quilting effect will become apparent as the detailed description of our invention proceeds.

The accompanying drawing illustrates our invention. In such drawing:

FIG. 1 is a diagrammatic view illustrating one method of producing a continuous quilted laminate which can be be cut into sections to provide the quilted laminated panels above described;

FIG. 2 is a fragmental isometric view, in partial section, illustrating one of our quilted laminated panels formed according to the method shown in FIG. 1;

FIG. 3 is a sectional view showing apparatus which can be employed to quilt a panel after it has been formed into a desired shape;

FIG. 4 is a view similar to FIG. 1, but showing a different embodiment of our invention;

FIG. 5 is a sectional view showing apparatus which can be employed for quilting a foam-elastomer pad; and FIG. 6 is a view similar to FIG. 2, but illustrating one of our quilted laminated panels embodying a pad quilted in the apparatus of FIG. 5.

The method of making a laminated padded panel shown in the drawings merely illustrates one method of forming a laminated structure adapted to be quilted according to our invention. The laminate formed by such a method comprises a metal sheet 10, which forms the basic structural member of the padded panel, a foam-elastomer pad 12 covering one face of said sheet, and a flexible skin 14 disposed over the top of said pad and bonded to the margins of the sheet extending beyond the edges of said pad.

The method of forming the laminated panels shown in the drawing comprises the subject-matter of the previously referred to patent application Serial No. 653,402, filed April 17, 1957, and may be described as follows:

In forming laminated padded articles in quantity production, it is convenient to laminate continuous strips of metal and the plastic skin with the pads interposed and spaced from each other, so that by cutting between the pads the continuous structure may be divided into individual panels. Such an operation is shown in FIG. 1, where the upper face of the metal sheet 10 is shown as coated with a suitable adhesive 16, by passing said sheet between a pair of coating rollers 18. Desirably, said adhesive is a thermoplastic resin, such as a polymer of polyvinylchloride. After the adhesive is applied to the metal strip said strip is passed through an oven 17 which heats the strip and adhesive to a temperature, say in the range of 375° F.–400° F., to soften and condition the adhesive for bonding the pads and skin to the metal.

Foam-elastomer pads 12 cut to the desired size and shape are shown as cemented on one face of a continuous sheet 14 of the skin-forming material and the two continuous strips, with the pads 12 between them, are brought together and passed between pressure rollers 20. The rollers 20 bring the superimposed panel components into intimate contact, with the softened adhesive 16 bonding the pads 12 to the metal and also providing a bond between those portions of the skin and metal sheet extending between and laterally beyond the pads 12. During this bonding operation, the rollers 20 also expel all of the air from the pads 12, compressing them into substantially solid non-resilient masses having only a fraction of their original thickness and disposed within a border defined by the lamination bond between the contacting portions of the panel and skin. After passing through the rollers 20, the skin covered padded sheet is cooled with water sprays 21, or any other suitable means to set the bonds of the laminate. The pads 12 are thereafter held compressed by atmospheric pressure until they are reinflated by pricking a minute hole 24 or plurality of such holes in the skin 14; the air entering said pad and filling the voids between the cellular elastomer structure. Alternatively, the air may be re-admitted to said pad by drilling a plurality of holes in the metal sheet 10 thus exposing areas of said pad to the air so that the air may enter the voids between the cellular walls of the elastomer.

Our present invention is concerned with quilting the padded face of such a laminated panel. In practicing one mode of our invention, the padded panel formed as described above, is passed between a heated embossing die 25 having the desired pattern of quilting and a stationary heated backup plate 26, with the skin surface presented toward the embossing die 25 and the metal sheet 10 disposed against the back-up plate 26, as shown in FIG. 1. The die 25 is then brought toward the plate 26 indenting the skin 14 and compressing the pad 12 against the metal 10 in the pattern of the die 25. This removes substantially all of the air spaces from the compressed areas of the pad to render them more heat conductive than the remaining thickened portions of the pad so that the heat from the die 25 and the plate 26 is readily conducted through the metal 10 and skin 14 to fuse these compressed pad areas. This melting action permanently deforms the pad so that its thickness is selectively reduced in the desired quilted pattern. The die 25 is then separated from the padded panel to permit the compressed melted portions of the elastomer to cool and solidify into a thin substantially solid layer of adhesive material which bonds the skin 14 to the metal 10 in the desired quilted pattern. The temperature to which the die and the plate are heated is of course dependent upon the melting point of the elastomer forming the pad 12. We have found that a die and plate temperature in the range of 550°–650° F. may be employed when the pad is formed from an elastomer such as polyvinylchloride.

The elongated laminated strip having the spaced quilted pads 12 embodied therein is then cut between the pads into panels of the desired shape, each such panel having a deeply quilted pad or pads, as shown in FIG. 2. It is to be understood, of course, that the panels can be produced on an individual unit basis, rather than by cutting a continuous laminated strip into sections; but in any event, our laminating and quilting process contemplates the production of panels each comprising a metal base sheet, one or more quilted pads on such sheet, and a flexible quilted skin covering the pads and bonded to the sheet beyond the margins of the pad or pads.

One of the principal advantages of the method of making padded articles as previously described is the production of a padded panel in which the pad is compressed during lamination; which permits the panel to be drawn or otherwise formed either within or beyond the extent of the pad before the pad is reinflated, with the compressed pad easily assuming the shape of the formed panel. Therefore, instead of reinflating the pad before embossing, as previously described, the reinflation can be postponed until after embossing. When this sequence is employed, the panel formed to the desired shape and with the pad still compressed is placed between a heated embossing die 28 having the same general configuration as the formed panel and heated plate 30, as shown in FIG. 3; and a quilting operation identical to that previously described is performed. After the compressed pad is quilted, air is re-admitted to the pad 12 whereupon it reassumes its original resilient spongy state but with the quilted pattern fused therein. Because this quilting operation forms tight seals between the skin 14 and the metal panel 10, each of the pad areas disposed between the quilted seals must be individually reinflated. This reinflation may be accomplished by pricking a hole or a plurality of holes, in each of said pad areas.

A modified form of carrying out our invention is shown in FIG. 4. In this modification, foam-elastomer pads 12' cut to the desired size and shape are cemented to one face of the continuous sheet 14' of the skin forming material. The skin 14' with the pads 12' thereon is then passed between a quilting roller 31 and back-up roller 32 with the quilting roller 31 bearing against the skin 14' to cause the pads on said strip to be selectively compressed against the roller 32 in the desired quilted pattern. Desirably, both of the rollers 31 and 32 are heated in any convenient manner so that the compressed heat conductive portions of the pads 12' will be fused as the pads pass between said rollers. After leaving the rollers 31 and 32, the compressed portions of the pads cool and solidify into the desired quilted pattern. The skins 14', being cemented to the pads 12', conforms to the quilted pattern of the pads and is thus provided with a quilted pattern identical to the pattern formed in the pads.

After this quilting operation, the skin 14' and the pads 12' are laminated to an adhesive coated metal sheet 10' by bringing the two continuous sheets together and passing them between a pair of pressure rollers 20' which dispose the superimposed panel components together in intimate contact; bonding the pads to the adhesive coated face of the metal 10', and bonding together those portions of the skin 14' and the metal 10' extending between and laterally beyond the quilted pads 12'.

As previously described, the laminating operation removes the air from the pads 12' compressing them to a fraction of their original thickness so that the panels formed by cutting the elongated laminated strip may be drawn or otherwise formed into the desired shape with the compressed pad easily assuming the shape of the panel. After such forming operation, air is re-admitted to the pad whereupon it reassumes its resilient spongy state but with the quilted pattern formed therein.

Still another modification of our invention adopted for the production of subtle quilting effects is shown in FIG. 5. In this modification, a foam-elastomer pad 34, which is to be encapsulated in a laminated padded article, is placed between an embossing die 36 and a back-up plate 38, both of which are heated in any convenient manner. The die and the plate are brought toward each other to selectively compress the pad 34 in the quilted pattern of the die 36. Again in this quilting operation as in the previously described quilting operations the compressed portions of the pad are fused by the heated die and plate to permanently fix the quilted pattern in the pad 34. The quilted pad is then removed from the die and cemented to a flexible stretchable skin, and the skin 42 and the pads 34 are then laminated to a metal sheet 43 according to the laminating methods already described. Because the flexible skin 42 is not forced and sealed into the pad depressions formed in the quilting operation, but is merely bonded over the quilted pad surface, the quilted appearance of the finished padded article will be extremely subtle; the skin extending only slightly into the quilted pad depressions, as shown in FIG. 6.

In practicing any of the several modifications of our invention, a second flexible skin may be bonded over a portion of the quilted skin 14 to produce a distinctive padded appearance in the finished padded article. This second skin may be bonded to the skin 14 either before or after the quilting operation depending upon the quilted appearance desired. When it is bonded to the skin 14 after quilting, a panel may be produced which will have both quilted and nonquilted areas within the extent of the pad with the nonquilted area having a different color or texture depending upon the material constituting the second skin.

While the several embodiments and modifications of our invention have been described as employing heated dies and rollers for producing a quilted pattern in a padded article, it is to be understood that these quilting tools may be substituted for each other and that other quilting techniques may be employed without departing from the spirit and scope of our invention.

One such of these other techniques that we have successfully employed is dielectric heating. When dielectric heating methods are used in our quilting operations, the material, or materials, to be quilted is placed between a pair of electrodes of a conventional dielectric heating apparatus, the material being quilted constituting the dielectric. The electrodes are then brought toward each other compressing the pad, and a high frequency current is passed through the material being quilted causing the pad to be fused in the desired quilted pattern. When the quilting operation is performed after the pad and skin have been bonded to the metal panel, the panel can serve as one of the electrodes during the heating cycle.

The term foam-elastomer as used herein includes all forms of cellular resilient material, such as vinyl foam, foam rubber, sponge rubber, urethane foam, and the like.

We claim as our invention:

1. A method of making a quilted padded article, comprising interposing a foam-elastomer pad between a sheet of rigid material and a sheet of flexible, stretchable material, the marginal portions of both sheets extending beyond the edges of the pad, forcing said two sheets toward each other to expel air from and compress the pad, bonding the pad-surrounding marginal portions of the two sheets together to form a seal around the compressed pad to prevent air from re-entering the pad, subsequently perforating one of said sheets within the limits of the pad to permit air to enter and reinflate the pad, and selectively compressing portions of said pad and heating only said selectively compressed portions to fuse them into thin substantially solid layers of elastomer to form a predetermined quilted pattern in said pad and in said sheet of flexible stretchable material covering said pad.

2. A method of making a quilted padded article as defined in claim 1 wherein said pad is selectively compressed and fused prior to being interposed between said two sheets of material.

3. A method of making a quilted padded article as set forth in claim 1 wherein said pad is selectively compressed and fused into the desired quilted pattern by passing said pad between a heated embossing die and backup plate prior to its being interposed between said two sheets of material.

4. A method of making a quilted padded article as set forth in claim 1 wherein portions of said pad are selectively compressed and fused to said sheet of flexible material to form a quilted pattern in said pad and sheet of flexible material prior to the step of compressing the pad between the pair of sheets and bonding the margins of said pair of sheets together.

5. A method of making a quilted padded article as set forth in claim 1 wherein said pad and sheet of flexible material are passed between a heated embossing roller and a back-up roller for selectively compressing and fusing portions of said pad to said sheet of flexible material to form a quilted pattern in said pad and sheet of flexible material prior to the step of compressing the pad between the sheets and bonding the margins of said sheets together.

6. A method of making a quilted padded article as set forth in claim 1 wherein subsequent to the operation of bonding the margins of said two sheets together and prior to the operation of perforating one of said sheets, selected portions of said pad are further compressed and fused for bonding said sheet of flexible material to said sheet of rigid material within the extent of their marginal bonds by the said further compressed and fused portions of said pad to form a quilted pattern in said pad and sheet of flexible material.

7. A method of making a quilted padded article as set forth in claim 1 wherein subsequent to the operation of bonding the margins of said two sheets together and prior to the operation of perforating one of said sheets, said two sheets with the compressed pad interposed therebetween are passed between a heated embossing die and back-up plate to selectively further compress and fuse portions of said pad for bonding said sheet of flexible material to said sheet of rigid material within the extent of their marginal bonds by the said further compressed and fused portions of said pad to form a quilted pattern in said pad and sheet of flexible material.

8. A method of making a quilted padded article as set forth in claim 1 wherein after the operation of perforating one of said sheets, selected portions of said pad are recompressed and fused for bonding said sheet of flexible material to said sheet of rigid material by the recompressed and fused portions of said pad to form a quilted pattern in said pad and sheet of flexible material.

9. A method of making a quilted padded article as set forth in claim 1 wherein after the operation of perforating one of said sheets, said two sheets with the compressed pad interposed therebetween are passed between a heated embossing die and back-up plate to selectively recompress and fuse portions of said pad for bonding said sheet of flexible material to said sheet of rigid material by the recompressed and fused portions of said pad to form a quilted pattern in said pad and sheet of flexible material.

References Cited in the file of this patent

UNITED STATES PATENTS

| | | |
|---|---|---|
| 2,232,783 | Hausheer | Feb. 25, 1941 |
| 2,282,169 | Cunnington | May 5, 1942 |
| 2,314,046 | Kalter | Mar. 16, 1943 |
| 2,434,527 | Untiedt | Jan. 13, 1948 |
| 2,621,138 | Messing | Dec. 9, 1952 |
| 2,621,139 | Messing | Dec. 9, 1952 |
| 2,708,296 | Soehner | May 17, 1955 |
| 2,713,892 | Knapp | July 26, 1955 |
| 2,723,666 | Greenberg | Nov. 15, 1955 |
| 2,752,279 | Alderfer | June 26, 1956 |
| 2,792,320 | Bower | May 14, 1957 |
| 2,878,153 | Hacklander | Mar. 17, 1959 |